United States Patent
Neese

(10) Patent No.: US 11,278,016 B2
(45) Date of Patent: Mar. 22, 2022

(54) SLIDING ROD HOLDER ASSEMBLY

(71) Applicant: Grady-White Boats, Inc., Greenville, NC (US)

(72) Inventor: David A Neese, Greenville, NC (US)

(73) Assignee: GRADY-WHITE BOATS, INC., Greenville, NC (US)

( * ) Notice: Subject to any disclaimer, the term of this patent is extended or adjusted under 35 U.S.C. 154(b) by 223 days.

(21) Appl. No.: 16/194,822

(22) Filed: Nov. 19, 2018

(65) Prior Publication Data

US 2019/0246794 A1    Aug. 15, 2019

Related U.S. Application Data

(60) Provisional application No. 62/629,743, filed on Feb. 13, 2018.

(51) Int. Cl.
| | | |
|---|---|---|
| *A47B 81/00* | (2006.01) |
| *B63B 29/02* | (2006.01) |
| *F16M 13/02* | (2006.01) |
| *A01K 97/10* | (2006.01) |
| *F16B 2/10* | (2006.01) |

(52) U.S. Cl.
CPC ............ *A01K 97/10* (2013.01); *A47B 81/005* (2013.01); *B63B 29/02* (2013.01); *F16B 2/10* (2013.01); *F16M 13/022* (2013.01)

(58) Field of Classification Search
CPC ......... B60R 7/08; A47B 81/00; A47B 81/005; A01K 97/10

USPC ................ 43/21.2; 224/922, 400, 401, 406; 114/255; 211/70.8; 206/315.11
See application file for complete search history.

(56) References Cited

U.S. PATENT DOCUMENTS

| | | | | |
|---|---|---|---|---|
| 2,854,147 A |   | 9/1958 | Derr | |
| 3,155,299 A | * | 11/1964 | Horne | B60R 5/006 224/311 |
| 3,359,928 A | * | 12/1967 | Gamble | A01K 97/10 297/188.01 |
| 3,376,614 A | * | 4/1968 | Stahl, Jr. | A01K 97/10 211/70.8 |
| 3,421,632 A |   | 1/1969 | Wood | |
| 3,524,572 A | * | 8/1970 | Hall | B60R 5/006 224/311 |
| 3,635,433 A |   | 1/1972 | Anderson | |
| 3,672,513 A | * | 6/1972 | Riddle | A01K 97/10 211/70.8 |
| 4,014,128 A | * | 3/1977 | Hrdlicka | A01K 97/10 43/21.2 |
| 4,027,798 A | * | 6/1977 | Swaim | A01K 97/08 211/4 |
| D272,787 S |   | 2/1984 | Rumbaugh | |
| 4,782,624 A |   | 11/1988 | Head | |

(Continued)

*Primary Examiner* — Darren W Ark
*Assistant Examiner* — Kevin M Dennis
(74) *Attorney, Agent, or Firm* — Olive & Olive, P.A.

(57) ABSTRACT

A fishing rod holder assembly is provided in a cabin of a boat. A rod holder locking member is mounted on a shelf in the cabin and is movable between an outboard position in the cabin and a position in the direction of the interior of the cabin. The locking member includes two plates hinged to each other to open and close, and having at least one cutout to receive and hold a rod handle therein. A rod tip holder is provided spaced from the rod holder locking member to support the tip of a fishing rod held within the assembly.

3 Claims, 14 Drawing Sheets

(56) References Cited

U.S. PATENT DOCUMENTS

| | | | | |
|---|---|---|---|---|
| 4,881,674 A * | 11/1989 | Medianik | ................ | B60R 5/006 |
| | | | | 224/311 |
| 4,897,952 A * | 2/1990 | Hawie | .................... | A01K 97/08 |
| | | | | 211/60.1 |
| 5,005,509 A * | 4/1991 | Williams | ................ | B63B 17/00 |
| | | | | 114/343 |
| 5,137,319 A | 8/1992 | Sauder | | |
| 5,487,475 A | 1/1996 | Knee | | |
| 5,544,797 A * | 8/1996 | Silva | ....................... | B60R 7/005 |
| | | | | 224/311 |
| 5,588,542 A | 12/1996 | Winkler, Jr. et al. | | |
| 5,657,883 A | 8/1997 | Badia | | |
| 6,401,381 B1 * | 6/2002 | Broberg | ................. | A01K 97/08 |
| | | | | 248/512 |
| 6,561,471 B1 * | 5/2003 | Hawie | .................... | A01K 97/10 |
| | | | | 211/60.1 |
| 6,899,304 B2 * | 5/2005 | Bellmore | .............. | F16L 3/1203 |
| | | | | 24/485 |
| 7,219,464 B1 | 5/2007 | Kujawa | | |
| 8,800,788 B1 | 8/2014 | Guidry | | |
| 8,875,963 B2 * | 11/2014 | Knutson | ................ | A01K 97/08 |
| | | | | 224/405 |
| 9,004,274 B2 * | 4/2015 | Thornberg | ............. | A01K 97/08 |
| | | | | 206/315.6 |
| 9,914,508 B2 * | 3/2018 | Neese | ..................... | B63B 29/04 |
| 2014/0137460 A1 * | 5/2014 | Weber | .................... | A01K 97/10 |
| | | | | 43/21.2 |
| 2017/0106949 A1 * | 4/2017 | Neese | ..................... | B63B 29/04 |
| 2019/0313813 A1 * | 10/2019 | Honermann | .......... | A47F 7/0028 |

* cited by examiner

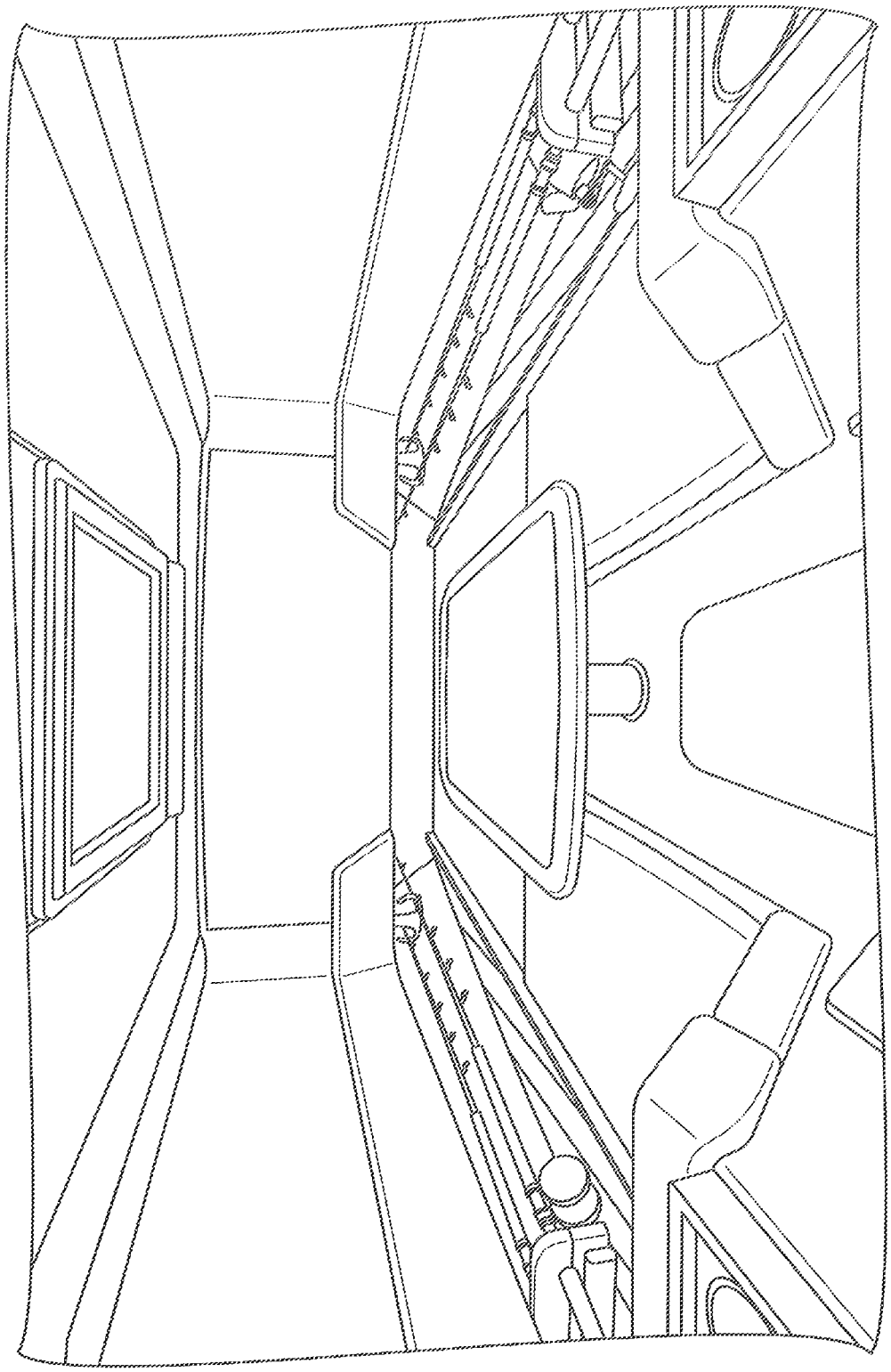

US 11,278,016 B2

SLIDING ROD HOLDER ASSEMBLY

CROSS-REFERENCE TO RELATED APPLICATIONS

This application is related to and claims priority to provisional application Ser. No. 62/629,743, entitled Sliding Rod Holder, filed Feb. 13, 2018, the disclosure of which is specifically incorporated by reference herein in its entirety.

FIELD OF INVENTION

This invention relates to a fishing rod holder assembly for securing fishing rods in a locked condition within cabins of boats. More specifically, the invention relates to a sliding rod holder locking member which is movable between two positions to allow ease of locking the fishing rods in a position being held by the rod holder, and for removing the fishing rods from the rod holder.

BACKGROUND

More affluent fishermen often own large, expensive boats with open cock-pits and a cabin. Such fishermen often purchase and use high-end, expensive fishing rods. Often such fishermen like to display these fishing rods in a cabin of a boat in a manner in which the rod is held and displayed securely and readily accessible within the cabin in a locked assembly.

The cabins on larger boats often have a dinette which can be converted into a sleeping area. Outboard at the level of the dinette are often found cubby holes which include a shelf for supporting items thereon underneath a bolster with a surface facing down along the cubby hole. The shelf and the downward facing surface define the cubby hole which is a relatively small snug space for storage.

While many boats provide rod holders above deck which may take many forms, it is often difficult to secure fishing rods in a locked and secure protected environment in the cabin in a manner in which the rods are not easily knocked off the shelf or out of a cubby hole due to the boat's motion in rougher seas.

In accordance with the invention, the problems of having high end fishing rods stored in an unprotected environment are avoided by providing a secure assembly for securing and displaying rods within a cabin of a boat.

SUMMARY

In accordance with the invention there is provided a sliding rod holder assembly which is attachable within a cabin of a boat. A shelf is typically found outboard of a dinette in the cabin in a cubby hole underneath a bolster. The bolster has a downward facing surface. The sliding rod holder assembly of the invention includes a sliding rod holder locking member and sliding rod holder tip supports, i.e. cradles. The locking member is mounted on the shelf and is constructed to slide away from the shelf upon which is supported, and toward the interior of the cabin. The locking member includes a bottom-locking plate, and a top-locking plate, which is hinged to the bottom-locking plate. At least one, and typically two openings, are defined by the top-locking plate and bottom-locking plate to receive fishing rod handles therein. The top-locking plate can be closed to abut the bottom-locking plate, and clipped shut to hold the fishing rod handles therein. At the tip end of the fishing rod is located a tip support in the shape of a cradle, which is supported optionally from the bottom surface of a cubby hole ceiling to support the fishing rod tips thereon.

The invention also relates to such a rod holder assembly in the cabin of a boat.

BRIEF DESCRIPTION OF THE DRAWINGS

Having thus briefly described the invention, the same will become better understood from the following detailed discussion, made with reference to the appended drawings wherein:

FIG. 14 is a perspective view of two rod holder assemblies mounted in a cabin of a boat.

DETAILED DESCRIPTION OF THE PREFERRED EMBODIMENTS

Figure 1:
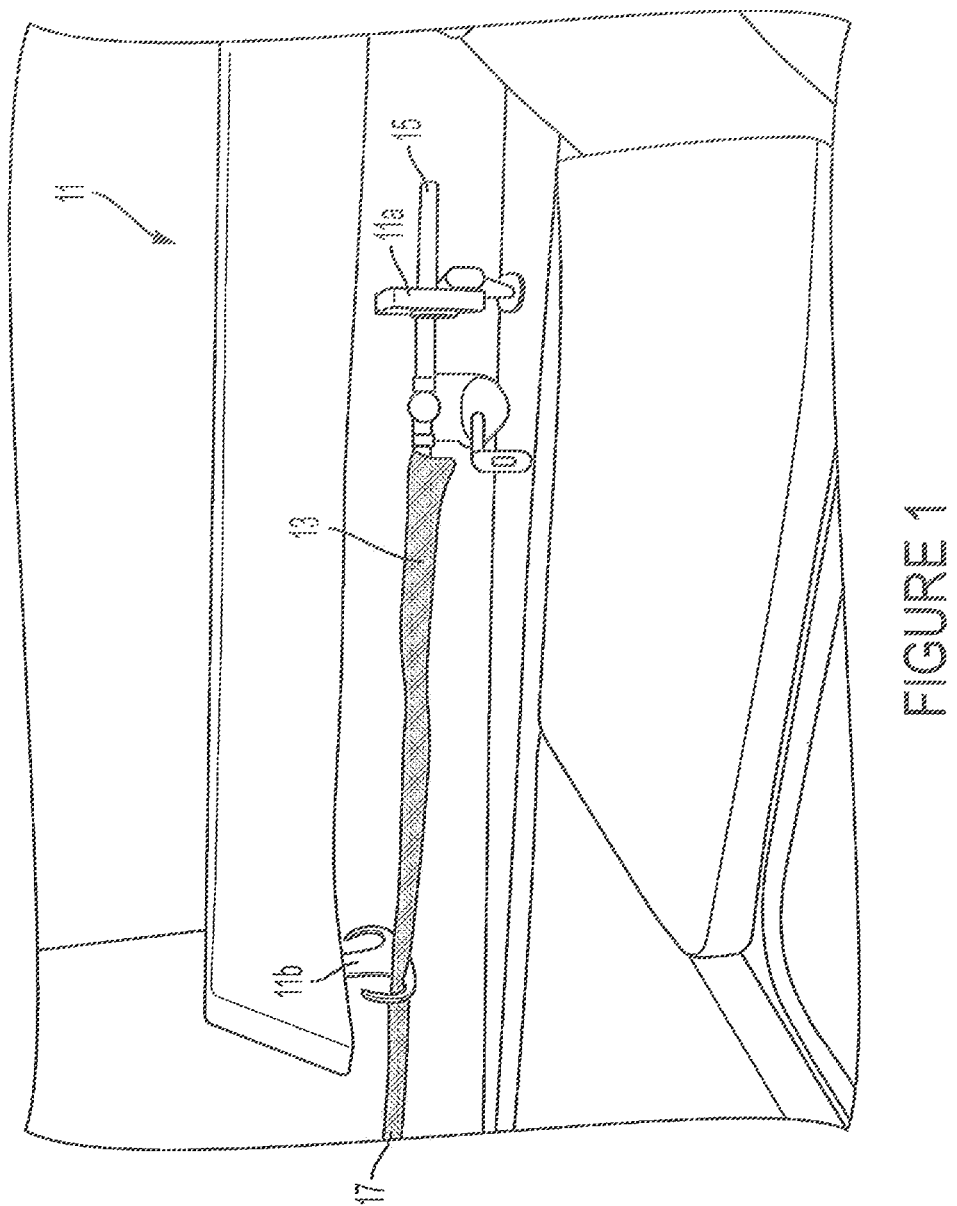
FIG. 1 is a perspective view of the sliding rod holder assembly of the invention, shown mounted on a shelf within a cubby hole storage area underneath a bolster in a cabin of a boat, and showing a fishing rod clamped in place at the handles with a locking mechanism, and the fishing rod tip supported by a cradle approximately at the location of the tip of the fishing rod.

FIG. 1 shows the sliding rod holder assembly 11 in accordance with the invention. The sliding rod holder assembly 11 is shown supporting a fishing rod 13 thereon. The sliding rod holder assembly 11 consists of a sliding rod holder locking member 11a and a sliding rod holder tip cradle 11b. The sliding rod assembly 11 is mounted within a cubby hole within a cabin of a boat. The fishing rod tip 17 is supported by the sliding rod holder tip cradle 11b, and a fishing rod handle 15 is shown locked in place in the sliding rod holder locking member 11a to hold at least one fishing rod 13 securely within the cubby hole below a bolster. Other types of rod tip supports include brackets supported on the floor of a cubby hole.

Figure 2:
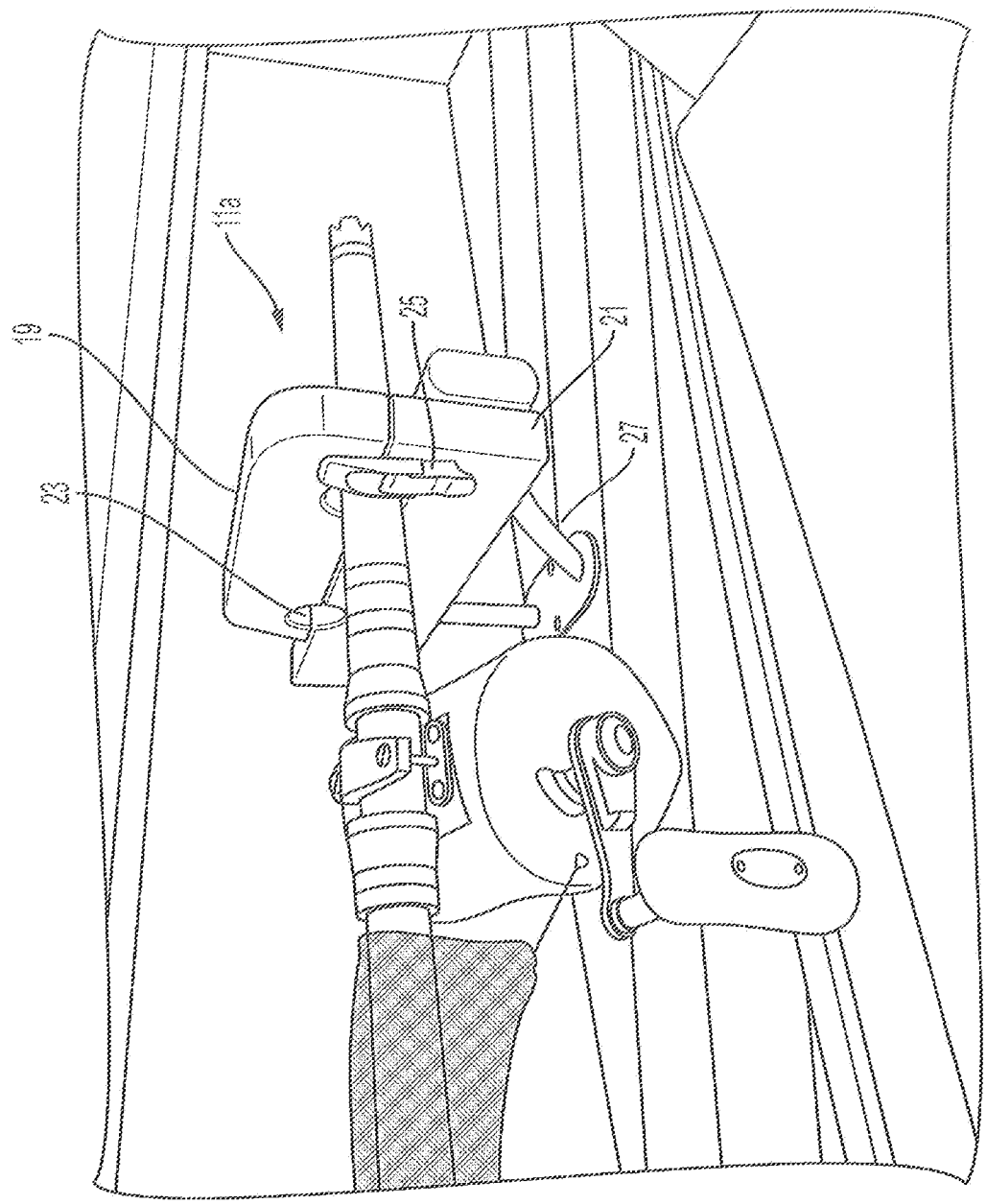
FIG. 2 is a perspective view from the front of the locking member for the sliding rod holder assembly shown with a fishing rod handle locked therein.

FIG. 2 is a perspective view of the sliding rod holder locking member 11a which is supported on a shelf by shelf support 27 which is connected to the sliding rod holder locking member 11a. The sliding rod holder locking member 11a includes a top-locking plate 19 which is hinged to pivot upward and away from a bottom-locking plate 21. At least one and preferably two cutouts 23 are provided to allow fishing rod handles 15 to be received therein.

Figure 3:
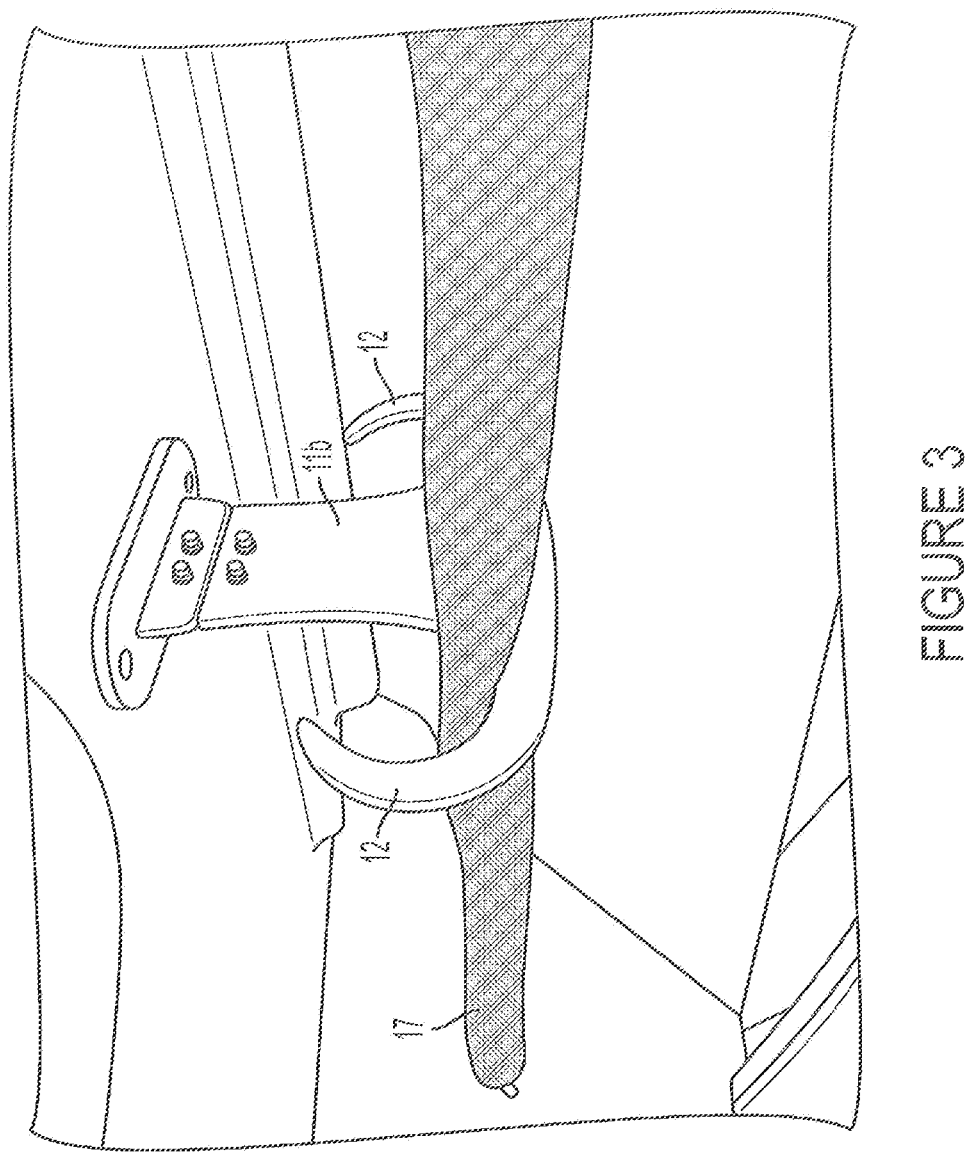
FIG. 3 is a perspective view showing the cradle of the sliding rod holder assembly of the invention supporting the tip of a fishing rod, with the cradle in a deployed position.

FIG. 3 illustrates the sliding rod holder tip cradle 11b including cradle resting extensions 12 which support at least one fishing rod tip 17. The sliding rod holder tip cradle 11b is shown in a deployed position but is hinged to allow it to be folded up against a surface making up the ceiling of the cubby hole. The sliding rod holder tip cradle 11b, as may be appreciated, is hinged preferably with a tension hinge to allow it to be locked in a deployed position, as well as locked in a non-deployed position against the ceiling surface of the cubby hole.

Figure 4:
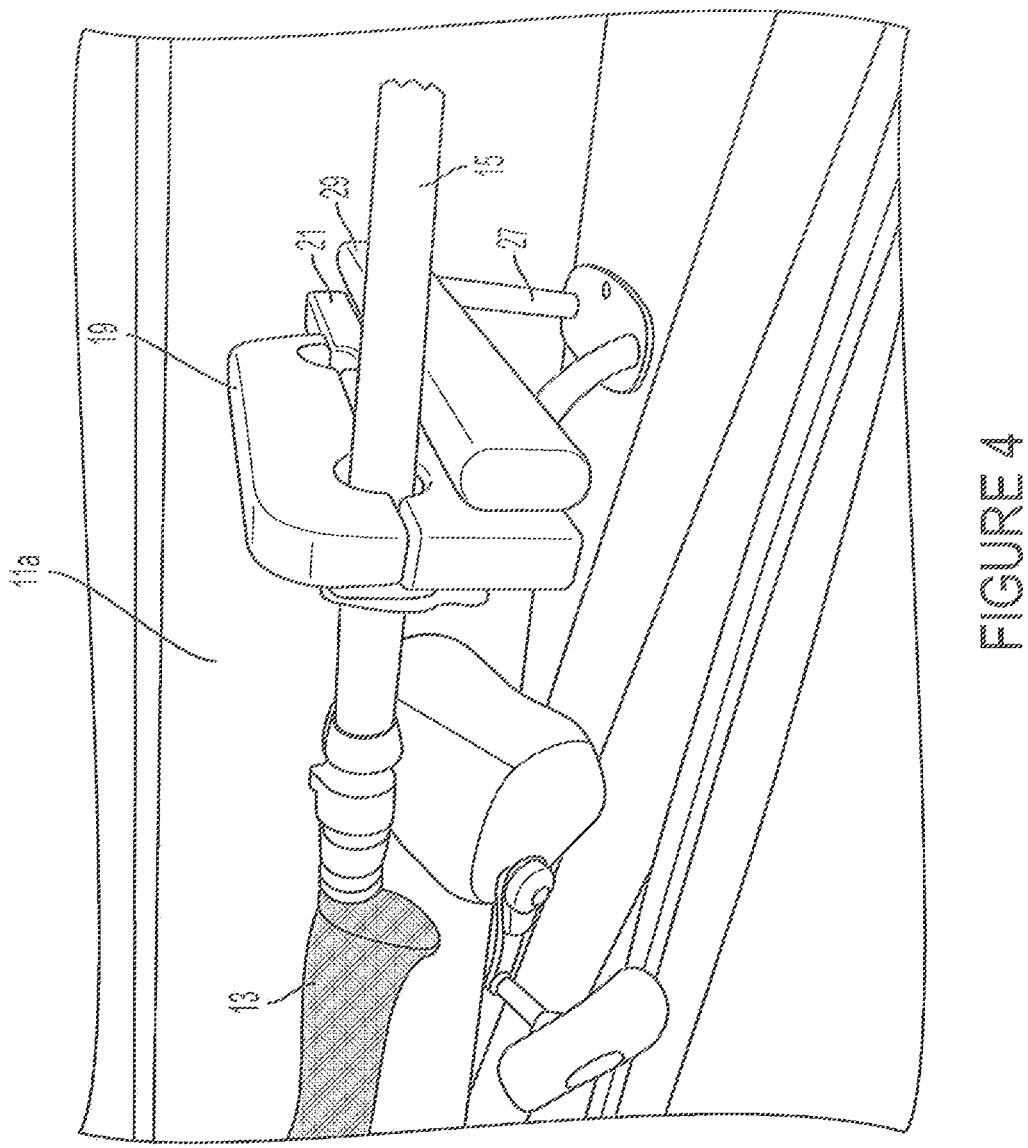
FIG. 4 is perspective view from the rear of the sliding rod holder locking member showing a slide mechanism to allow the sliding rod holder locking member to be moved out and away from the cubby hole, and back into the cubby hole for storage.

FIG. 4 illustrates the sliding rod holder locking member 11a which includes top-locking plate 19, shown in closed position against bottom-locking plate 21, with a fishing rod handle 15 in the sliding rod holder locking member 11a, and within the cubby hole in a non-extended position. When it is desired to remove the fishing rod 13 the sliding rod holder locking member 11a can be slid outward from the cubby hole with slide mechanism 29 to allow the fishing rod 13 to be removed by moving open the top-locking plate 19. A clip mechanism 25 can be used to lock the locking member 11a in the stored or external position.

Figure 5:
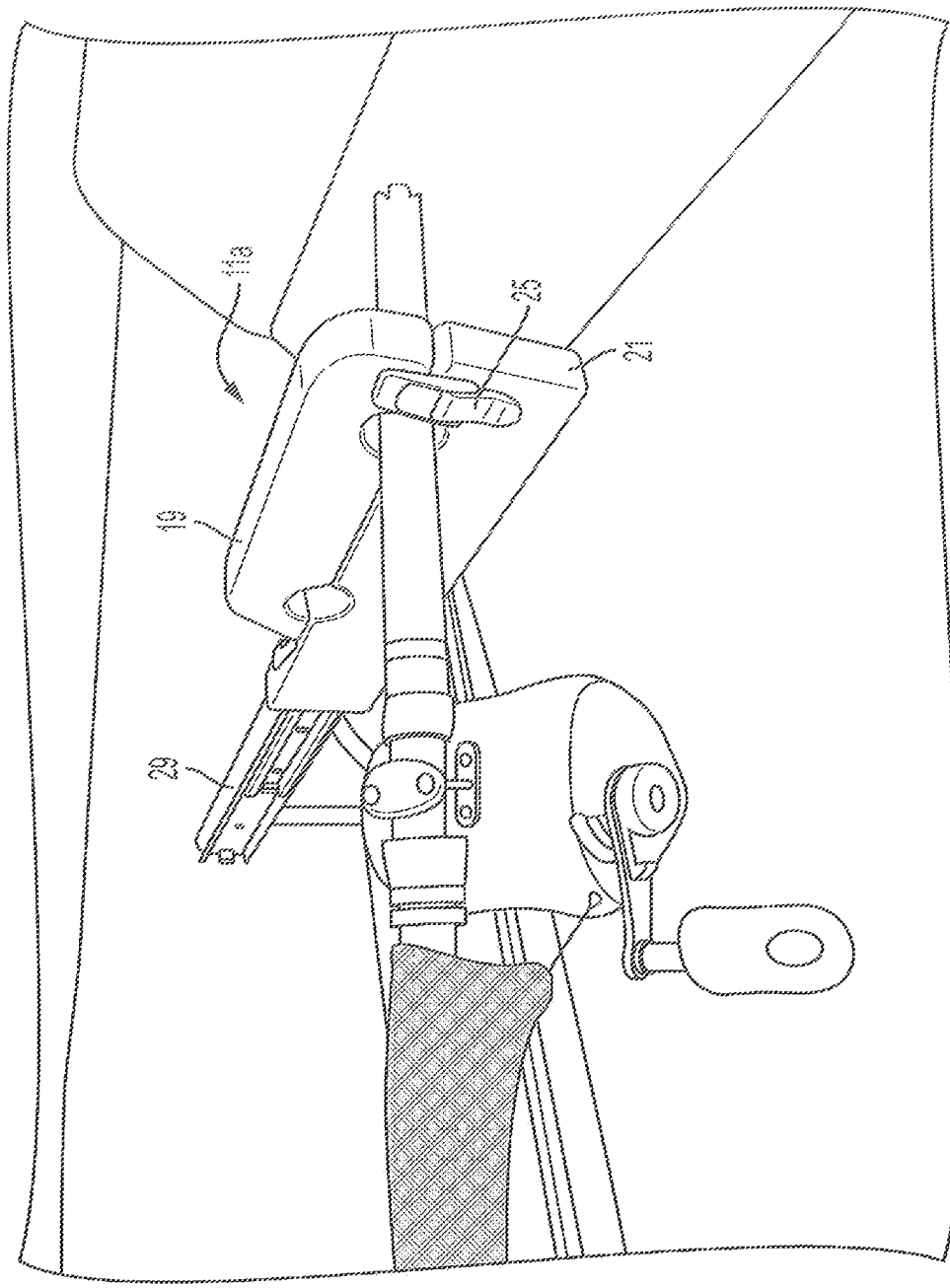
FIG. 5 is a perspective view from the front showing the sliding rod holder locking member in an extended position on a slide away from a cubby hole to allow ease of removing the fishing rods and/or securing the fishing rods within the sliding rod holder locking member.

FIG. 5 is a view similar to FIG. 4, but in front perspective view showing clip mechanism 25 locking top locking plate 19 and bottom locking plate 21 together. Other types of slides or sliding mechanisms that can be used include any mechanism that can securely hold a rod handle in a removable manner and allow the rod handle to be moved into and out of a cubby hole in which it is mounted.

Figure 6:
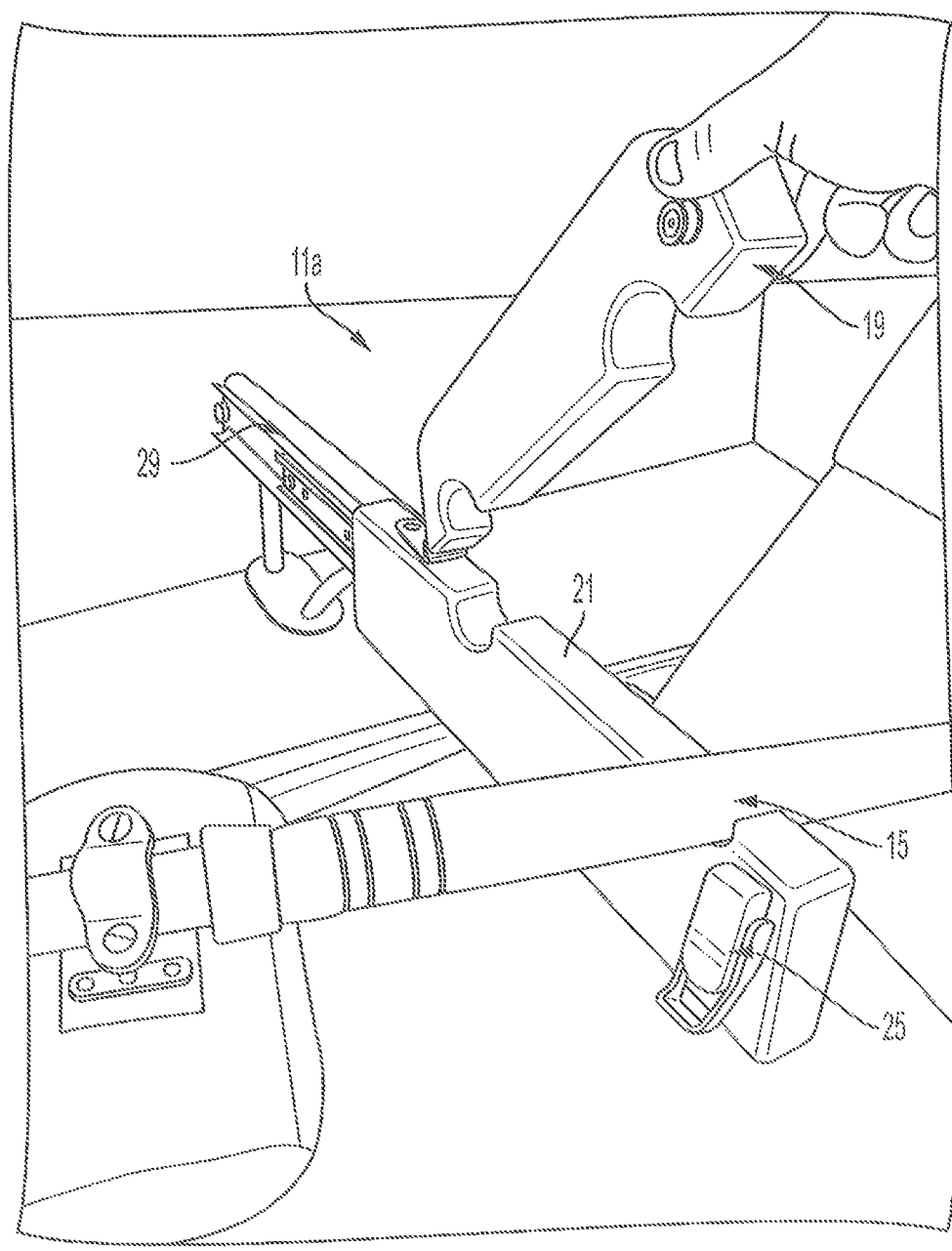
FIG. 6 is a perspective view from the front showing the sliding rod holder locking member extended away from the cubby hole with the top-locking plate pivoted away from the bottom-locking plate, to allow a fishing rod handle to be received therein.

FIG. 6 is another view showing the sliding rod holder locking member 11a in an extended position relative to slide mechanism 29, with top-locking plate 19 open relative to bottom-locking plate 21, and with a fishing rod handle 15 supported thereon.

Figure 7:
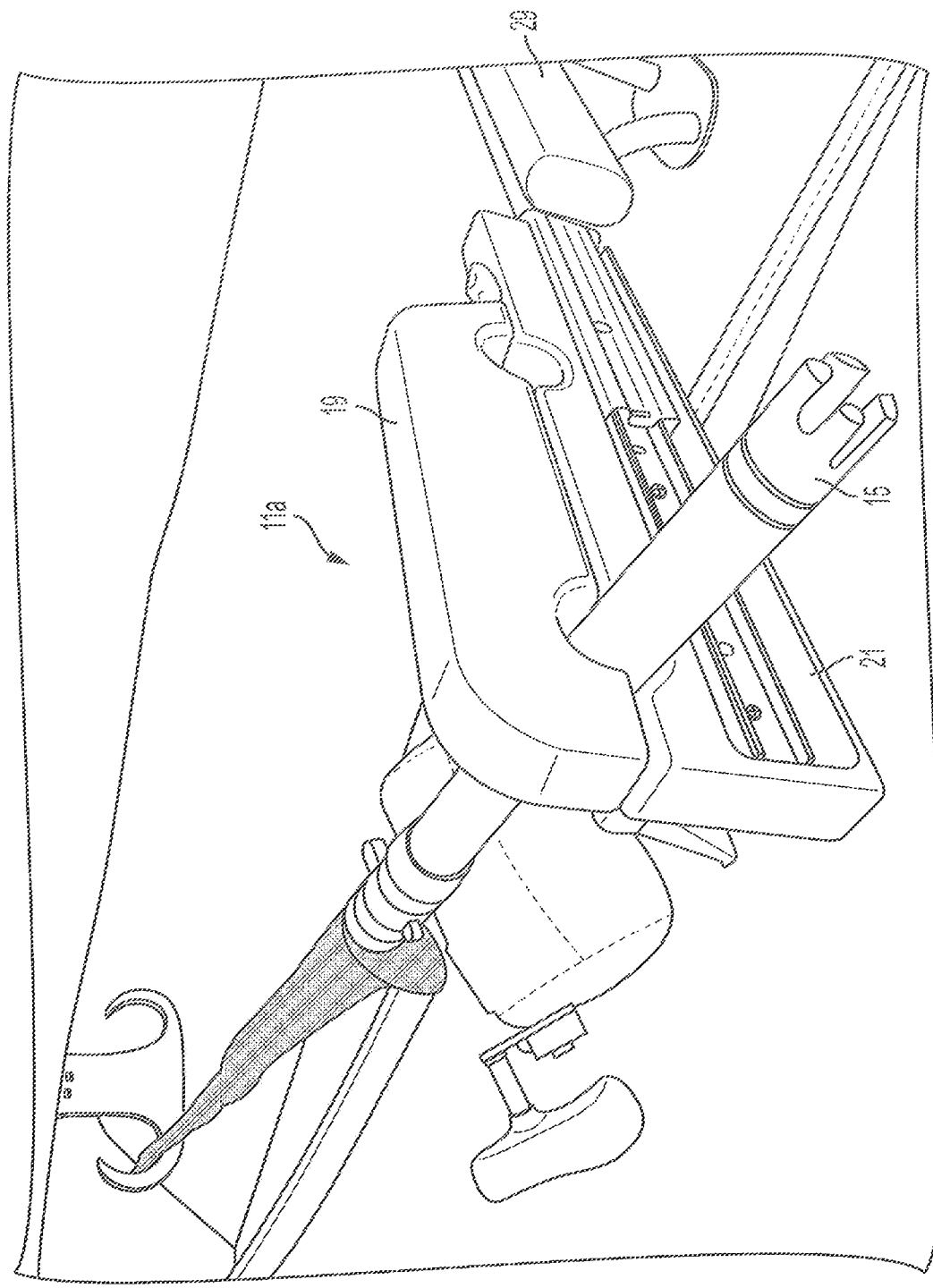
FIG. 7 is a perspective view from the rear of the sliding rod holder locking member shown in locked position, with a fishing rod handle secured therein, and with the sliding rod holder locking member extended away from the cubby hole by being pulled away toward the interior of the cabin on the slide.

FIG. 7 is a view from the rear of sliding rod holder locking member 11a with top-locking plate 19 shown in a closed position, and with the sliding rod holder locking member 11a shown in an extended position relative to the slide mechanism 29, and with the fishing rod handle 15 held securely therein.

Figure 8:
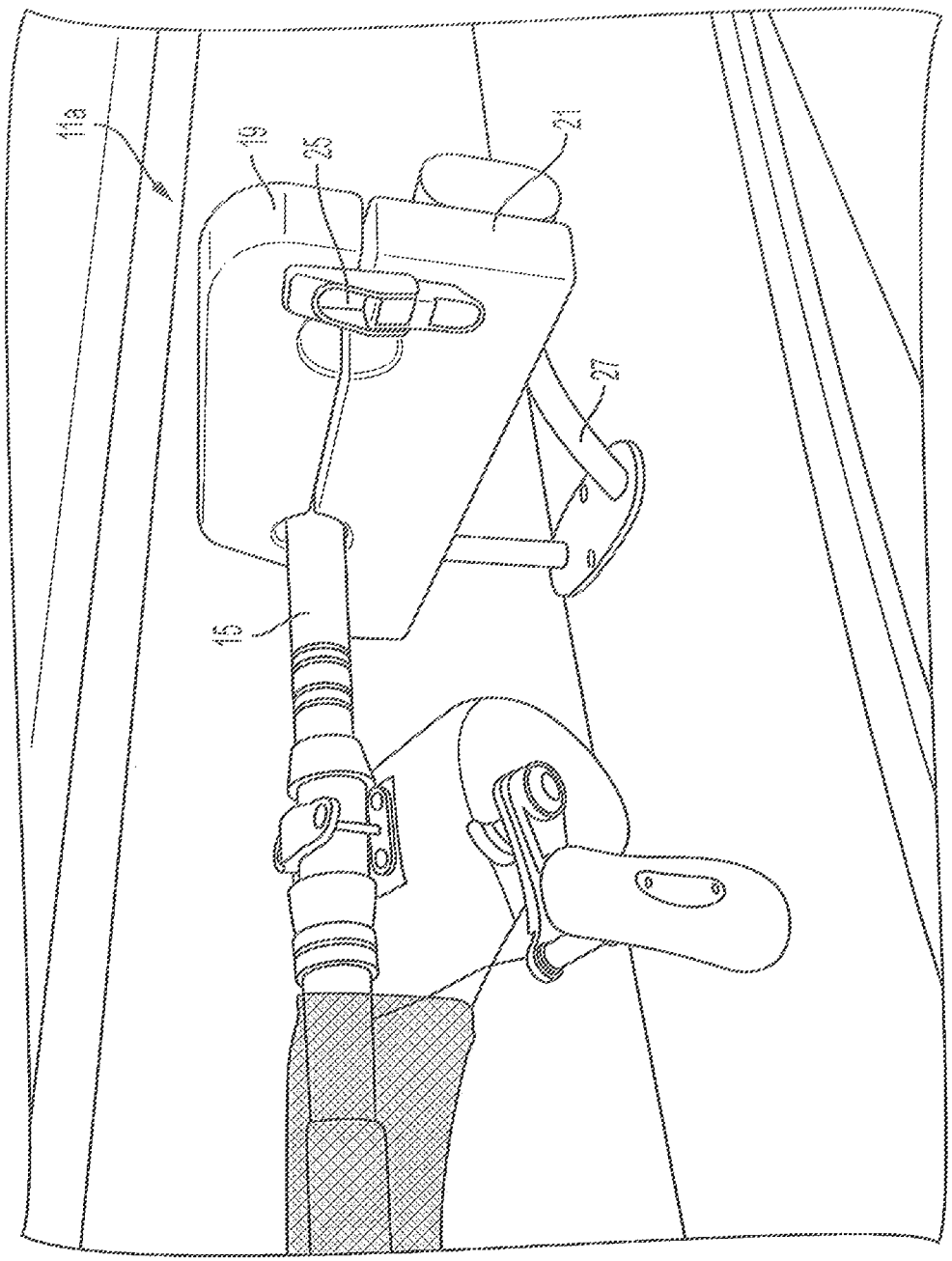
FIG. 8 is a perspective view from the front of the sliding rod holder locking member in a closed condition, and in a non-extended position within the cubby hole of the cabin, and showing a handle of a fishing rod locked therein.

FIG. 8 shows the sliding rod holder locking member 11a in a stowed position within the cubby hole holding a fishing rod handle 15 securely therein with the top-locking plate 19 in a closed position and secured against the bottom-locking plate 21 by the clip mechanism, i.e., locking clip 25. The shelf support 27 supports the sliding rod holder locking member 11a within the cubby hole.

Figure 9:
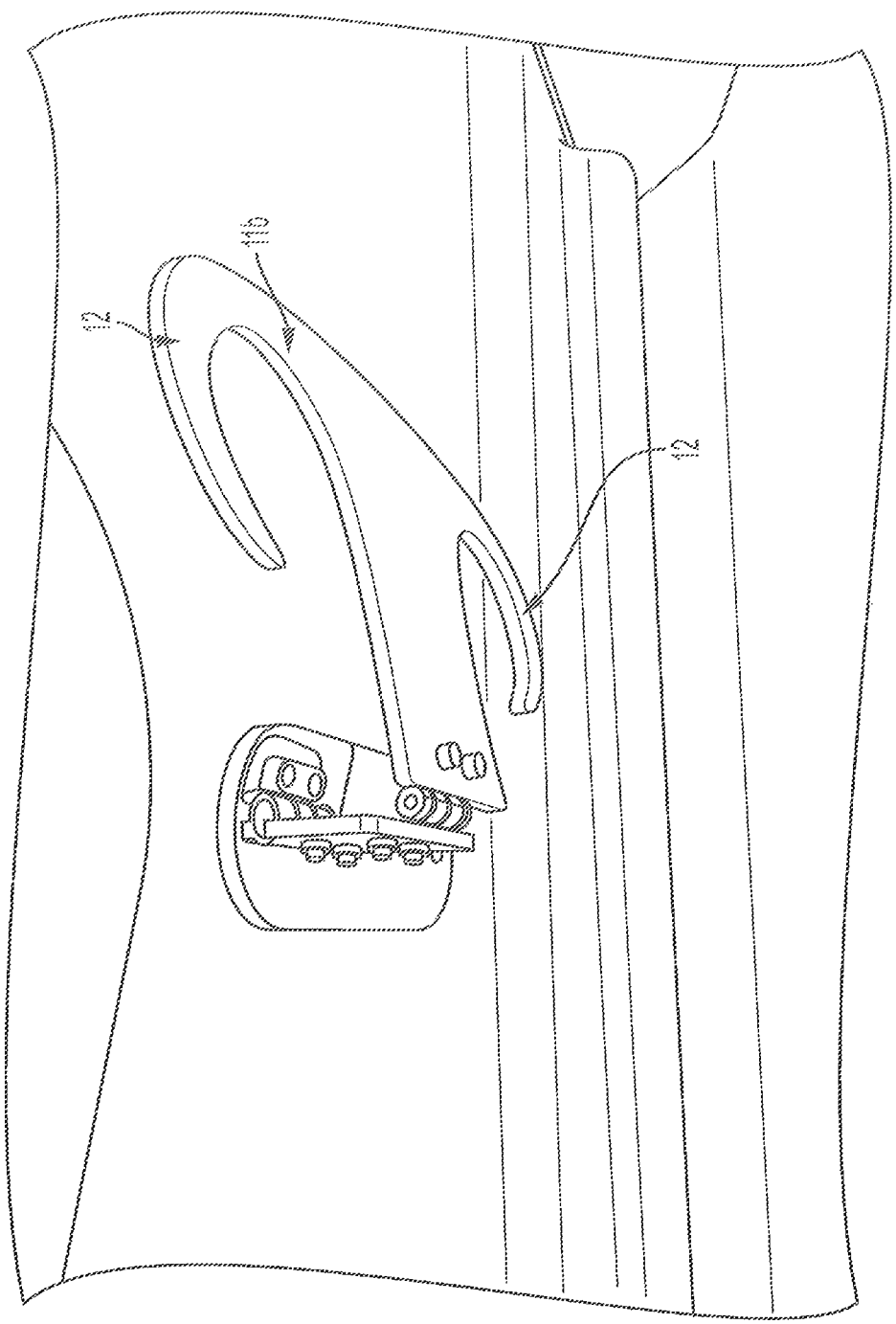
FIG. 9 is a perspective view of the sliding rod holder tip cradle assembly of the invention shown in a retracted position.

FIG. 9 shows the sliding rod holder tip cradle 11b with cradle resting extensions 12 in a non-deployed condition pivoted against the ceiling of the cubby hole.

Figure 10:
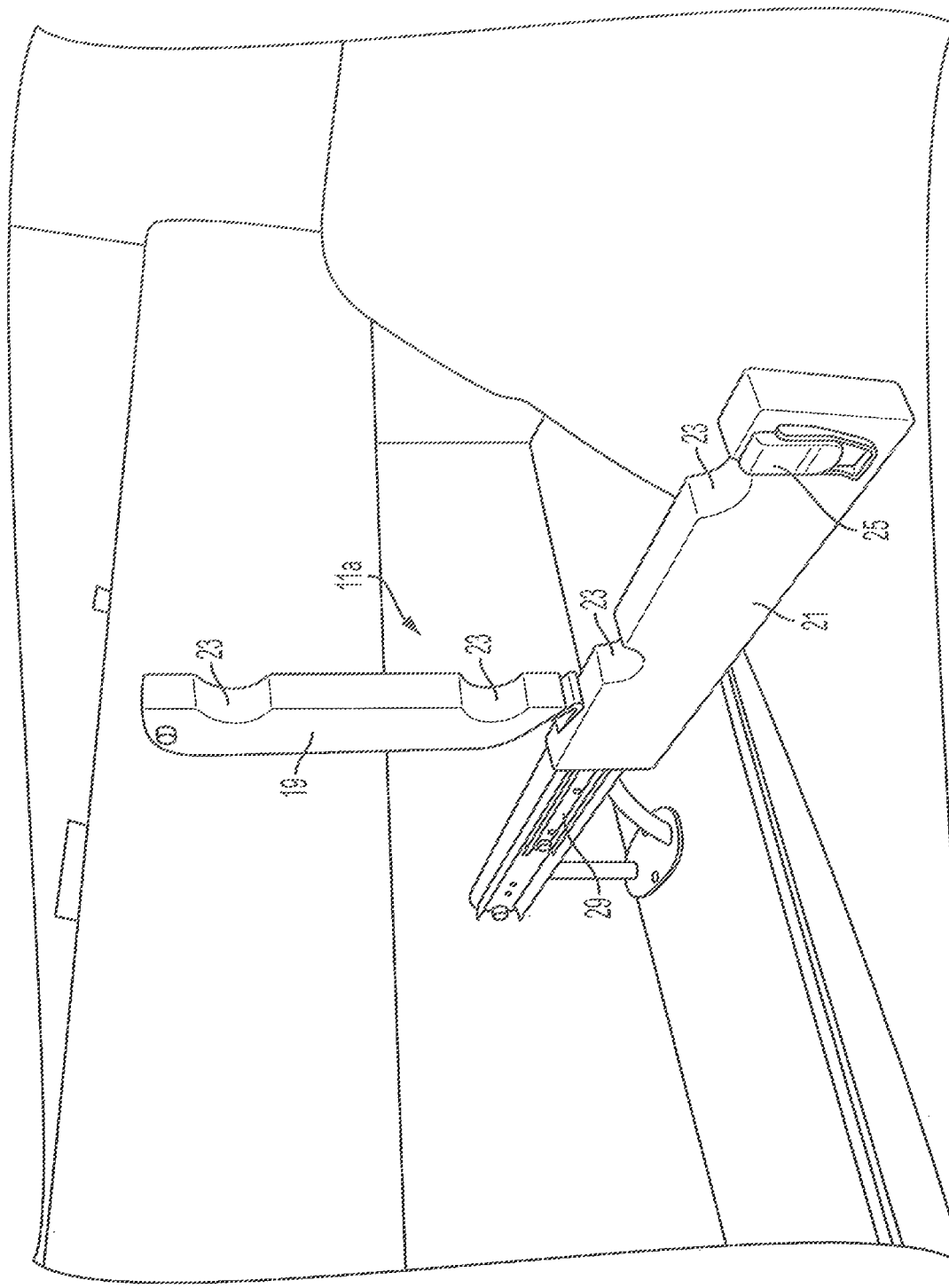
FIG. 10 is a perspective view from the front of the sliding rod holder locking member shown in a condition where it extends beyond the cubby hole toward the interior of the cabin, and with the top-locking plate in open position.

FIG. 10 is a perspective view from the front of the sliding rod holder locking member 11a with top-locking plate 19 in open condition relative to bottom-locking plate 21, and showing the cutouts 23 and locking clip 25, and with the sliding rod holder locking member 11a shown extended towards the interior of the cabin through the slide mechanism 29.

Figure 11:
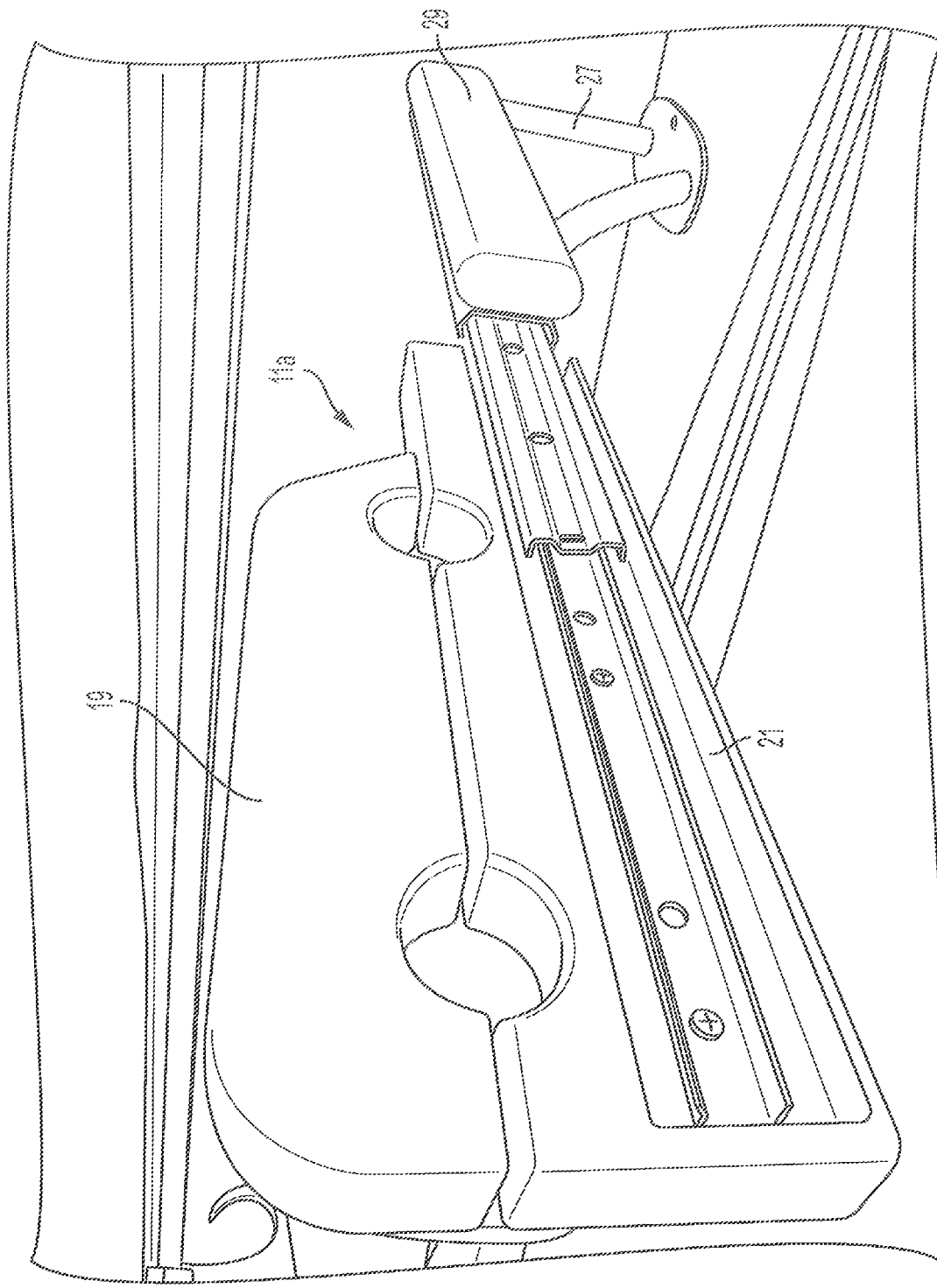
FIG. 11 is a perspective view from the rear of the sliding rod holder locking member of FIG. 10 with the top locking plate in closed position.

FIG. 11 is a view from the rear of the locking member 11a.

Figure 12:
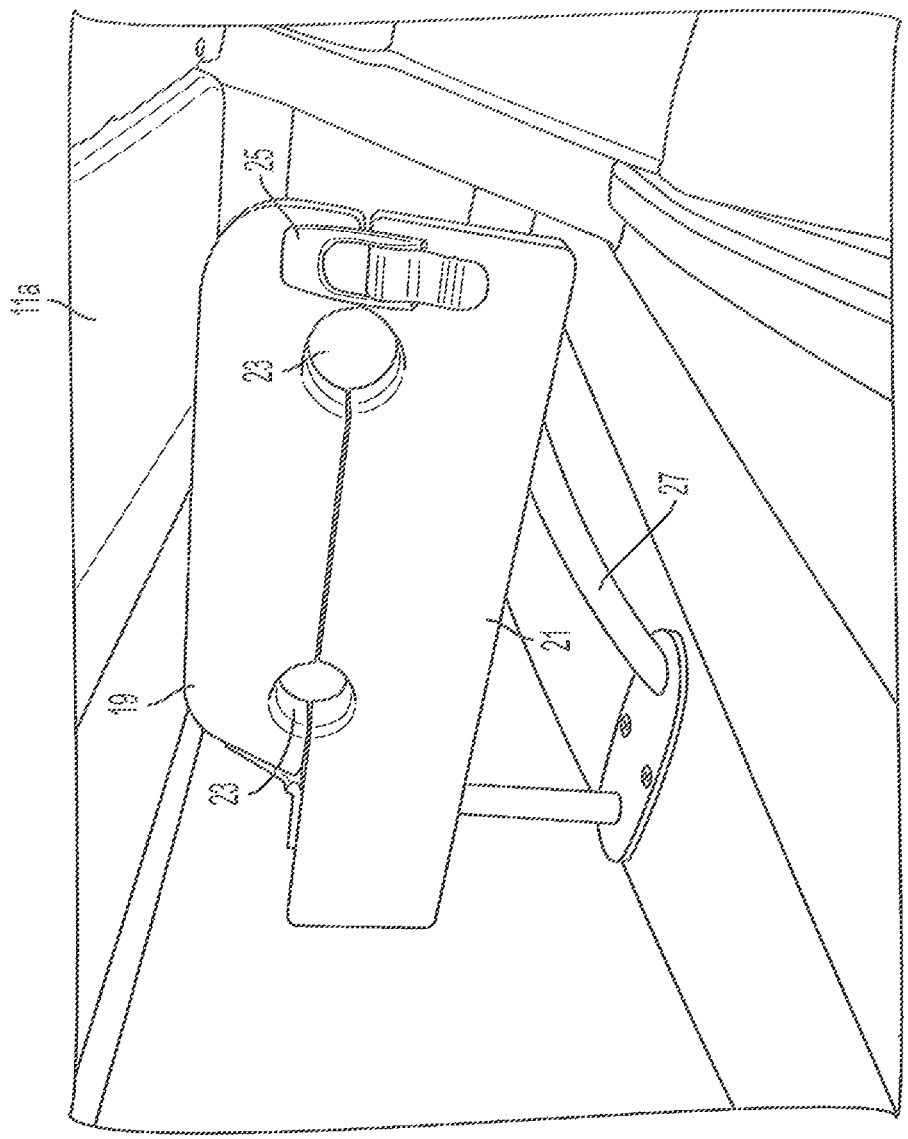
FIG. 12 is a view from the front of the rod holder locking member that of FIG. 11, but showing the top-locking plate in a closed position.

FIG. 12 is a view from the front of the sliding rod holder locking member 11a shown retracted relative to the slide mechanism 29, and in closed condition.

Figure 13:
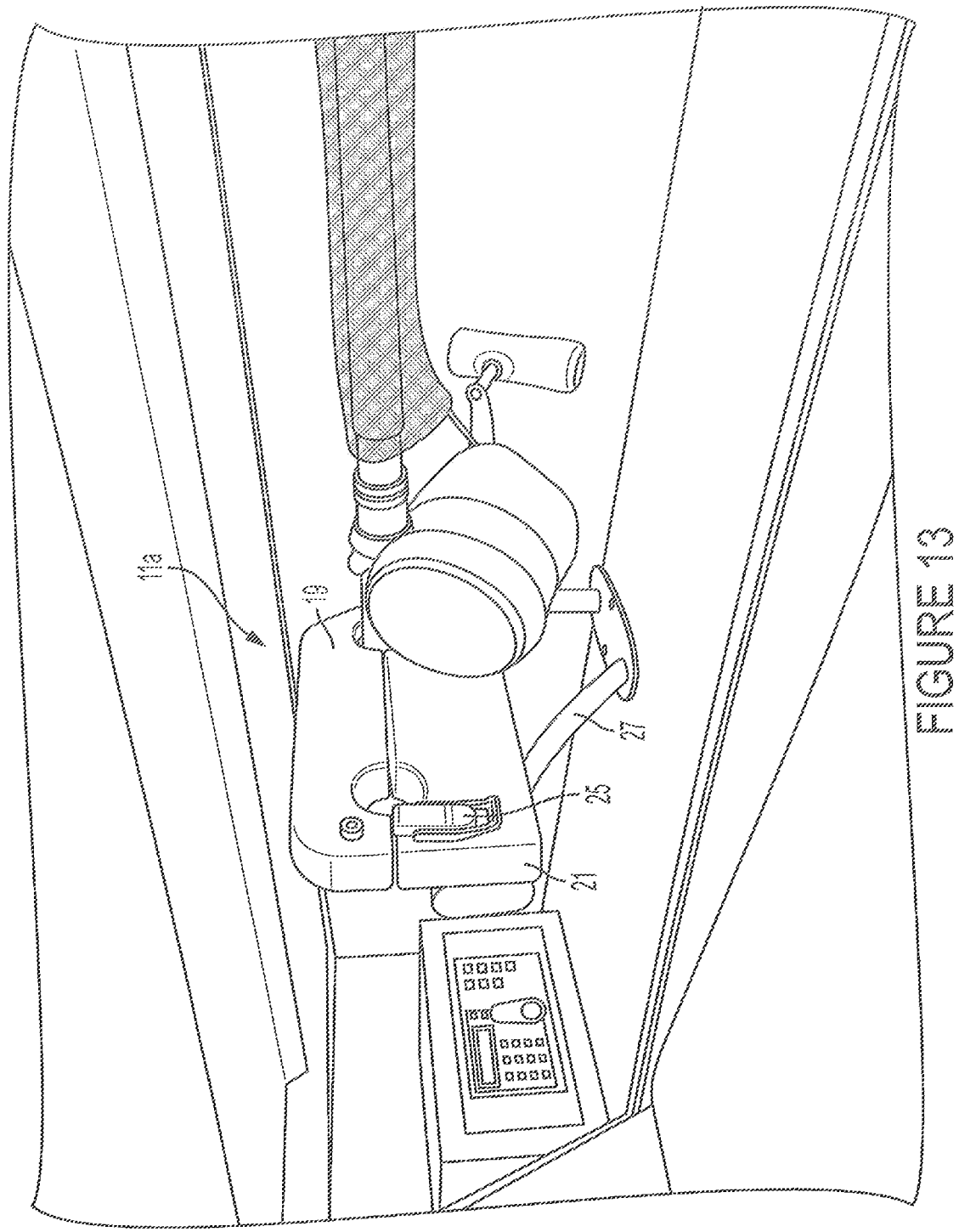
FIG. 13 is a perspective front view of the sliding rod holder locking member shown in a closed position and retracted within a cubby hole of the cabin.

FIG. 13 is a view from the front of the sliding rod locking member 11a shown in closed condition with the locking clip 25 holding the top-locking plate 19 against the bottom-locking plate 21 with a rod held therein.

FIG. 14 is a positive view of a cabin with two rod holder assemblies mounted therein.

While the invention has been described in great detail, it will be understood that alternative modifications and embodiments are intended to be within the scope of what is considered to be the invention as reflected in a non-limiting manner in the appended claims.

What is claimed:

1. A rod holder assembly, consisting substantially of:
   a) a rod holder locking member mounted on a shelf in a cabin of a boat, said rod holder locking member comprising a fixed base mounted to the shelf, wherein the fixed base comprises a slide attached to the locking member and configured to move the locking member between a first and a second position, said first position away from the interior of the cabin and said second position toward the interior of the cabin;
   b) said rod holder locking member comprising a top locking plate and a bottom locking plate hinged to each other to have the top locking plate movable between an open position and a closed position in abutment with the bottom locking plate, and the top locking plate and bottom locking plate each having two cutouts to define two circular openings for holding handles of two rods respectively when the top locking plate is in the closed position for holding the handles of the two rods within the two circular openings;
   c) a locking clip for locking the top locking plate and bottom locking plate in the closed position; and
   d) a rod tip support mounted within the cabin to a surface above the shelf through a hinge for allowing the rod tip support to be folded, to be flush against the surface above when not in use at a location spaced from the rod holder locking member for supporting a tip of the rod having its handle locked in said rod holder locking member, the rod tip support comprising two curved cradle shaped members for supporting tips of two rods, and attached to the surface above the shelf in the cabin on which the slidable rod holder locking member is mounted.

2. The rod holder assembly of claim 1, wherein said locking clip is connected to the top locking plate and the bottom locking plate for locking the top locking plate to the bottom locking plate in the closed position.

3. The rod holder assembly of claim 1, further comprising a plurality of rod holder assemblies mounted in the cabin of the boat.

\* \* \* \* \*